United States Patent [19]

Asada

[11] Patent Number: 5,052,181

[45] Date of Patent: Oct. 1, 1991

[54] HEAT SENSITIVE ACTUATOR

[75] Inventor: Isamu Asada, Kiyose, Japan

[73] Assignee: Nihon Seiken Kabushiki Kaisha, Tokorozawa, Japan

[21] Appl. No.: 589,833

[22] Filed: Sep. 26, 1990

[30] Foreign Application Priority Data

Dec. 25, 1989 [JP] Japan ............................. 1-148884[U]
Mar. 7, 1990 [JP] Japan ............................. 2-22713[U]

[51] Int. Cl.$^5$ ............................................. F03G 7/06
[52] U.S. Cl. .................................................... 60/527
[58] Field of Search ................. 236/99 R, 100, 101 R, 236/86, 87; 60/527, 528, 530, 531

[56] References Cited

U.S. PATENT DOCUMENTS

| 3,131,269 | 4/1964 | Asakawa | 60/527 X |
| 3,300,134 | 1/1967 | Wahler | 236/100 X |
| 3,395,580 | 8/1968 | Kuze | 60/527 |
| 3,611,713 | 10/1971 | Janous | 60/527 |

Primary Examiner—Allen M. Ostrager
Attorney, Agent, or Firm—Armstrong, Nikaido, Marmelstein, Kubovcik & Murray

[57] ABSTRACT

A heat sensitive actuator including a casing; a thermal expansion fluid contained in the casing; a piston rod inserted from an opening of the casing into the fluid and adapted to be moved outside the casing by thermal expansion of the fluid; a shoulder formed on an inner circumference of the casing at an opening portion thereof, which shoulder has a conical shape tapering inward of the casing; a plug formed of an elastic material such as rubber for sealing the fluid, which plug has a through-hole for allowing insertion of the piston rod; and an intermediate ring inserted in a part of the through-hole of the plug and interposed between an inner circumference of the plug and the outer circumference of the piston rod. The plug is forced into the shoulder to be elastically compressed and thereby radially urge an outer circumference of the piston rod. A contact area between the plug and the piston rod can be reduced by providing the intermediate ring to thereby reduce a frictional resistance of the piston rod.

8 Claims, 2 Drawing Sheets

5,052,181

HEAT SENSITIVE ACTUATOR

BACKGROUND OF THE INVENTION

The present invention relates to a heat sensitive actuator to be used as a driving source for an engine coolant thermostat, for example.

It is known that such an actuator includes a casing, a thermal expansion fluid such as wax contained in the casing, and a piston rod inserted in the casing and adapted to be moved outside the casing by thermal expansion of the fluid.

In the above known actuator, a sealing member formed of an elastic material such as rubber is normally provided in an opening end portion of the casing. The sealing member is compressed in an axial direction of the piston rod upon assembling of the actuator. By such a compression force, the sealing member is elastically deformed to be expanded in a radial direction of the piston rod and be pressed against an outer circumference of the piston rod, thereby sealing the fluid.

It is originally necessary to prevent leakage of the fluid at a sealing portion between the sealing member and the piston rod. Further, it is also necessary to reduce a frictional resistance of the piston rod upon movement thereof so that a high sensitivity to heat and a low hysteresis in operation may be ensured.

To meet these requirements in the above-mentioned known actuator, the compression force to be applied to the sealing member must be strictly set so as to properly control the pressing force to be applied to the piston rod. However, as the compression force to be applied to the sealing member is normally given by caulking upon assembling of the actuator, the compression force is largely dispersed, and the proper control of the pressing force is difficult. Accordingly, a product quality is rendered ununiform to cause the generation of leakage of the fluid or excess frictional resistance of the piston rod.

SUMMARY OF THE INVENTION

It is accordingly an object of the present invention to provide a heat sensitive actuator which can reliably prevent leakage of the fluid and reduce a frictional resistance of the piston rod.

According to the present invention, there is provided a heat sensitive actuator comprising a casing; a thermal expansion fluid contained in said casing; a piston rod inserted from an opening of said casing into said fluid and adapted to be moved outside said casing by thermal expansion of said fluid; a shoulder formed on an inner circumference of said casing at an opening portion thereof, said shoulder having a conical shape tapering inward of said casing; a plug formed of an elastic material such as rubber for sealing said fluid, said plug having a through-hole for allowing insertion of said piston rod, said plug being forced into said shoulder to be elastically compressed and thereby radially urge an outer circumference of said piston rod; and an intermediate ring inserted in a part of said through-hole of said plug and interposed between an inner circumference of said plug and the outer circumference of said piston rod, in order to reduce a contact area between said plug and said piston rod and thereby reduce a frictional resistance of said piston rod.

The intermediate ring is formed of a low-friction material having a flexibility. Alternatively, it is formed of a hard material, and has a hole for allowing loose insertion of the piston rod.

With this construction, the plug is compressed by the shoulder to radially urge the piston rod, thereby sealing the fluid. Accordingly, a sealing pressure can be set uniform irrespective of a pressing force to be applied to the plug upon assembling of the actuator.

Further, even when a thickness of the plug in the axial direction of the piston rod is made large so as to easily force the plug into the shoulder without inclination, a contact area between the plug and the piston rod can be reduced by providing the intermediate ring. Therefore, a frictional resistance of the piston rod can be reduced.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to the drawings.

Figure 1:
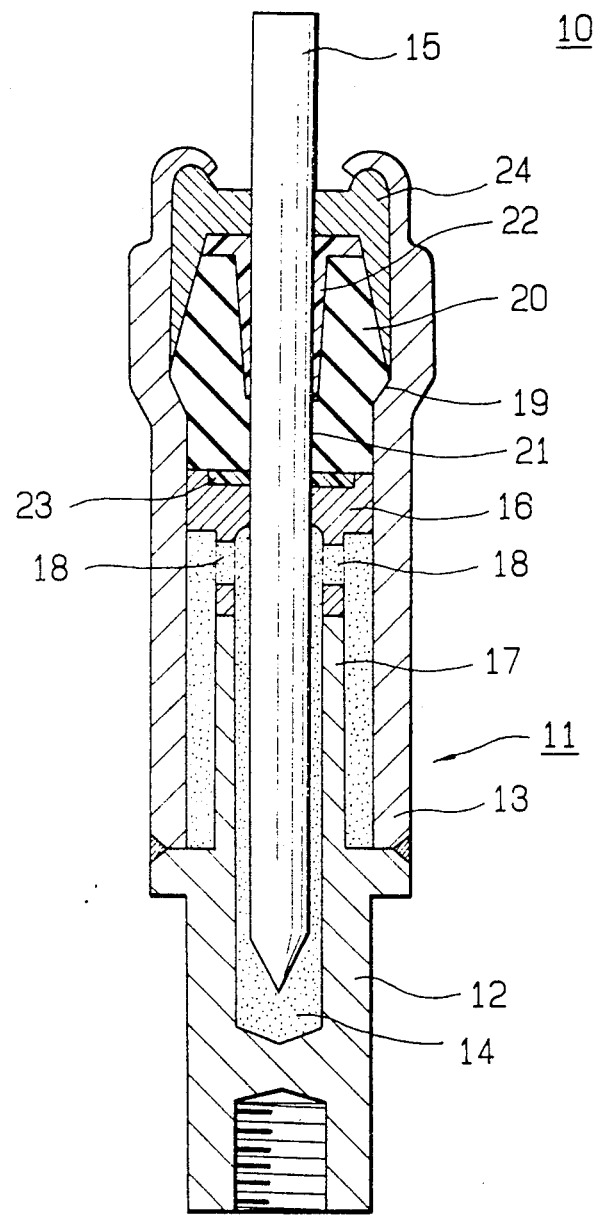
FIG. 1 is a vertical sectional view of the heat sensitive actuator according to a first preferred embodiment of the present invention.

Referring to FIG. 1 which shows a first preferred embodiment of the present invention, reference numeral 10 generally designates a heat sensitive actuator according to the first preferred embodiment. A casing 11 of the actuator 10 is constructed of a bottom member 12 and a cylindrical member 13 welded together. A thermal expansion fluid 14 such as wax or silicone oil is contained in the casing 11.

A piston rod 15 is movably provided in the casing 11 in such a manner that one end portion of the piston rod 15 is disposed in the fluid 14 and the other end portion is disposed outside the casing 11.

An inner guide member 16 for guiding the movement of the piston rod 15 is fitted with an inner circumference of the cylindrical member 13 of the casing 11, and abuts against an upper end of a cylindrical projection 17 extending from the bottom member 12 of the casing 11. The inner guide member 16 is formed with a plurality of through-holes 18 for allowing passage of the fluid 14.

A shoulder 19 is formed on the inner circumference of the cylindrical member 13 of the casing 11 at an upper opening portion thereof. The shoulder 19 has a conical shape such that a diameter is gradually reduced from an upper end to a lower end.

A plug 20 formed of an elastic material such as rubber is provided under compression in the upper opening portion of the casing 11. The plug 20 has a central through-hole 21 for allowing insertion of the piston rod 15. An outer diameter of the plug 20 under an uncompressed condition is set to be slightly larger than the diameter of the shoulder 19 at the upper end thereof. When the plug 20 is forced into the shoulder 19 after insertion of the piston rod 15 into the through-hole 21 of the plug 20, the plug 20 is elastically deformed to be compressed to radially urge the piston rod 15, thereby sealing the fluid 14.

An intermediate ring 22 formed of a low-friction material having a flexibility such as polytetrafluoroethylene or polypropylene is fitted with the plug 20. The intermediate ring 22 has a thin-walled cylindrical portion and an upper flange portion integrally formed with each other. The cylindrical portion is inserted into a part of the through-hole 21 of the plug 20 before the plug 20 is forced into the shoulder 19, so that the cylindrical portion is interposed between an outer circumference of the piston rod 15 and an inner circumference of the plug 20. The upper flange portion is disposed to abut against an upper end of the plug 20. A length of the cylindrical portion is set to be slightly smaller than a thickness of the plug 20 (i.e., a length of the plug 20 in an axial direction of the piston rod 15), so that a contact area between the plug 20 and the piston rod 15 can be made small.

A ring-like bite prevention member 23 formed of plastic such as polytetrafluoroethylene is provided between the plug 20 and the inner guide member 16. The piston rod 15 is closely fitted with an inner circumference of the ring-like bite prevention member 23. The bite prevention member 23 functions to prevent the plug 20, formed of an elastic material, from being deformed upon insertion of the piston rod 15 into the through-hole 21 of the plug 20 by biting engagement between the inner circumference of the inner guide member 16 and the outer circumference of the piston rod 15.

An outer guide member 24 is fixed by caulking to an upper opening of the casing 11. The outer guide member 24 functions to press the plug 20 and the intermediate ring 22 and guide the movement of the piston rod 15.

In operation, when the fluid 14 is expanded because of temperature increase, the piston rod 15 is moved outside the casing 11 by the fluid 14. On the other hand, when the temperature decreases, the piston rod 15 can be inserted into the casing 11 again.

Figure 2:
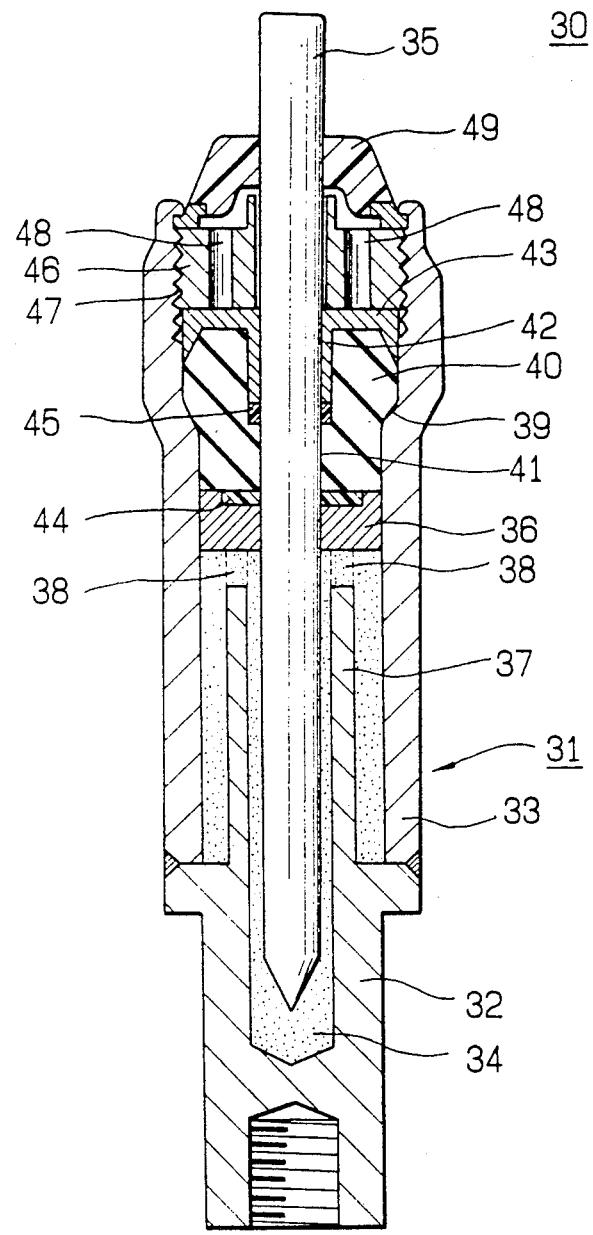
FIG. 2 is a vertical sectional view of the heat sensitive actuator according to a second preferred embodiment of the present invention.

Referring next to FIG. 2 which shows a second preferred embodiment of the present invention, reference numeral 30 generally designates a heat sensitive actuator according to the second preferred embodiment. The heat sensitive actuator 30 includes a casing 31 having a bottom member 32 and a cylindrical member 33, a thermal expansion fluid 34, a piston rod 35, an inner guide member 36, a shoulder 39 and a plug 40 having a central through-hole 41. The construction of these elements is substantially the same as that of the first preferred embodiment except that an upper opening portion of the casing 31 is threaded, and that the inner guide member 36 is not formed with holes but a cylindrical projection 37 of the bottom member 32 is formed with a plurality of holes 38 for allowing pass of the fluid 34.

An intermediate ring 42 formed of a hard material such as metal is cylindrical, and it is inserted in the through-hole 41 of the plug 40. The intermediate ring 42 is integrally formed with an outer guide member 43 for pressing the plug 40. After the plug 40 is forced into the shoulder 39, the intermediate ring 42 is inserted into the through-hole 41 of the plug 40, so that it is interposed between an outer circumference of the piston rod 35 and an inner circumference of the plug 40. An inner diameter of the intermediate ring 42 is set in such a manner that the piston rod 35 may be loosely inserted with almost no friction therebetween. A length of the intermediate ring 42 is set to be slightly smaller than a thickness of the plug 40 (i.e., a length of the plug 40 in an axial direction of the piston rod 35), so that a contact area between the plug 40 and the piston rod 35 may be made small.

A ring-like bite prevention member 44 formed of plastic such as polytetrafluoroethylene is provided between the plug 40 and the inner guide member 36 so as to be closely fitted with the outer circumference of the piston rod 35. The bite prevention member 44 functions to prevent that the plug 40 formed of an elastic material will be deformed upon downward movement of the piston rod 35 to bite into between the inner circumference of the inner guide member 36 and the outer circumference of the piston rod 35. Similarly, another ring-like bite prevention member 45 formed of plastic such as polytetrafluoroethylene is provided between the plug 40 and the intermediate ring 42 so as to be closely fitted with the outer circumference of the piston rod 35. The bite prevention member 45 functions to prevent that the plug 40 will be deformed upon upward movement of the piston rod 35 to bite into between the inner circumference of the intermediate ring 42 and the outer circumference of the piston rod 35.

A presser member 46 is provided for pressing the outer guide member 43 and the plug 40. The presser member 46 is formed at its outer circumference with an external thread to be engaged with an internal thread 47 formed at the upper opening portion of the casing 31. Reference numerals 48 denote holes for assisting screw rotation of the presser member 46 upon assembling of the actuator. Further, the presser member 46 is formed with a central hole through which the piston rod 35 is loosely inserted.

An upper cover 49 for covering the presser member 46 is fixed by caulking to an upper opening of the casing 31.

The operation of the second preferred embodiment is substantially the same as that of the first preferred embodiment.

As described above, the plug is compressed by the shoulder to radially urge the piston rod, thereby sealing the fluid. Accordingly, even if a pressing force to be applied to the plug upon assembling of the actuator such as a caulking strength is not uniform, a sealing pressure can be made constant to thereby obtain a stable quality without leakage of the fluid.

Further, even when the thickness of the plug is made large so as to easily force the plug into the shoulder and set a high sealing pressure for reliable prevention of the leakage, the contact area between the piston rod and the plug can be reduced by providing the intermediate ring. Accordingly, a frictional force to be applied from the plug to the piston rod upon movement thereof can be reduced to achieve a high sensitivity and a low hysteresis.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A heat sensitive actuator, comprising:
   a casing including an enclosure portion bounding a predetermined interior volume, and said casing including an outer portion having a conically tapering shoulder;
   a plug frictionally received within said outer portion of said casing and being in contact with said conically tapering shoulder, said plug having a first opening therethrough;

an intermediate ring fixedly connected to said plug, said intermediate ring having a second opening therethrough;

a thermal expansion fluid contained in said predetermined interior volume in said casing;

a piston rod slidably extending through said first opening in said plug and said second opening in said intermediate ring, said piston rod having an end which projects into said fluid in said predetermined interior volume, and said piston rod is movable relative to said casing by thermal expansion of said fluid;

said plug being elastomeric for sealing said fluid within said interior volume, said plug being elastically compressed against said shoulder such that it exerts pressure radially against an outer circumference of said piston rod; and said intermediate ring being disposed in a part of said first opening of said plug, in order to reduce a contact area between said plug and said piston rod and thereby reduce a frictional resistance of said piston rod.

2. The heat sensitive actuator as defined in claim 1, wherein said intermediate ring is formed of a low-friction material having flexibility.

3. The heat sensitive actuator as defined in claim 1, wherein said intermediate ring is formed of a hard material, and said piston rod is loosely inserted through said intermediate ring.

4. A heat sensitive actuator, comprising:

a casing including an outer cylindrical member having a conically tapering shoulder, a bottom member closing a bottom end of said outer cylindrical member, and a cylindrical projection projecting from said bottom member coaxially within said outer cylindrical member; said casing having an inner guide member closely fitted within said outer cylindrical member and having a first opening therethrough, an intermediate ring fixedly connected to said plug and having a second opening therethrough, and a plug frictionally received within said outer cylindrical member and being retained within said outer cylindrical member by said shoulder, said plug having a third opening therethrough; said inner guide member being spaced from said bottom member and sealing a predetermined interior volume bounded by said bottom member and said outer cylindrical portion; said inner guide member having an annular projection which extends coaxially within said outer cylindrical member toward said bottom member; said cylindrical projection being elongated and having a free end in engagement with a surface of said annular projection of said inner guide member;

a thermal expansion fluid contained in said interior volume in said casing;

a piston rod slidably extending through said first, second, and third openings such that one end of said piston rod projects into said fluid, and said piston rod is movable relative to said casing by thermal expansion of said fluid;

said plug being elastomeric and being elastically compressed against said shoulder within said outer cylindrical member such that said plug exerts pressure radially against an outer circumference of said piston rod; and said intermediate ring reducing a frictional contact area between said piston rod and said plug by reducing deformation of said plug during movement of said piston rod relative to said plug, and thereby reduce a frictional sliding resistance of said piston rod.

5. A heat sensitive actuator as claimed in claim 4, wherein said annular projection of said inner guide member has a plurality of openings therethrough permitting passage of said thermal expansion fluid.

6. A heat sensitive actuator as claimed in claim 4, further comprising an outer guide member sealed between an end of said outer cylindrical member and said plug, wherein said plug is retained within said outer cylindrical member by said outer guide member.

7. A heat sensitive actuator as claimed in claim 6, wherein said intermediate ring extending axially within said plug along a predetermined distance, said predetermined distance being less than a total axial extent of said third opening in said plug, said second opening of said intermediate ring loosely receiving said piston rod; and wherein said intermediate ring extends radially outwardly along one end surface of said plug.

8. The heat sensitive actuator as defined in claim 7, wherein said intermediate ring is formed of a low-friction material which is relatively hard.

* * * * *